(12) United States Patent
Kim et al.

(10) Patent No.: US 8,145,445 B2
(45) Date of Patent: Mar. 27, 2012

(54) WSN-BASED CONTEXT AWARENESS ENGINE

(75) Inventors: Jang-Kyu Kim, Seoul (KR);
Seung-Wan Ryu, Yongin-si (KR);
Sei-Kwon Park, Incheon (KR);
Yun-Yong Jung, Seoul (KR)

(73) Assignee: Metarights Ltd., Seoul (KR)

( * ) Notice: Subject to any disclaimer, the term of this patent is extended or adjusted under 35 U.S.C. 154(b) by 359 days.

(21) Appl. No.: 12/490,645

(22) Filed: Jun. 24, 2009

(65) Prior Publication Data
US 2009/0316594 A1    Dec. 24, 2009

(30) Foreign Application Priority Data

Jun. 24, 2008  (KR) .................. 10-2008-0059535

(51) Int. Cl.
*H04L 12/26*  (2006.01)

(52) U.S. Cl. .............................. 702/90; 706/45; 715/708
(58) Field of Classification Search .................... 702/90; 706/47, 45; 370/252; 715/708; 718/100
See application file for complete search history.

(56) References Cited

U.S. PATENT DOCUMENTS
2009/0157587 A1 *  6/2009  Lim et al. .................. 706/47
* cited by examiner

*Primary Examiner* — Drew A Dunn
*Assistant Examiner* — Hien Vo
(74) *Attorney, Agent, or Firm* — Blank Rome LLP

(57) ABSTRACT

A WSN-based context awareness engine applies spatial filtering to sensed data which is output from sensors included in a group to filter data in which an error does not occur, identifies a non-operated sensor, compares filtered data with at least one condition to determine a current state of a place corresponding to the group, and combines the determined current state and information regarding the group to generate a context-awareness result.

10 Claims, 7 Drawing Sheets

WSN-BASED CONTEXT AWARENESS ENGINE

CROSS-REFERENCE TO RELATED APPLICATION

This application claims the benefit under 35 U.S.C. §119 from Korean Patent Application No. 10-2008-0059535, filed on Jun. 24, 2008, in the Korean Intellectual Property Office, the entire disclosure of which is incorporated herein by reference.

BACKGROUND OF THE INVENTION

1. Field of the Invention

The present disclosure relates to a context-awareness engine, and more particularly, to a context-awareness engine for processing sensed data and perceiving context under the wireless sensor network (WSN) environment.

2. Description of the Related Art

A WSN or a ubiquitous sensor network (USN) refers to one of main technologies of the ubiquitous system in which various sensors sense data and transmit the sensed data to a corresponding computer through a network and the sensor middleware of the computer intelligently analyzes the sensed data. That is, the WSN or USN technology adds a network concept to the sensor which senses circumferential physical phenomena and manages and controls information sensed by the sensor in real time in association with the network.

However, a conventional WSN or USN technology has focused on the operation of receiving and controlling the sensed data, rather than the operation of analyzing the sensed data and perceiving the context. Therefore, there is a demand for a method of perceiving context using sensed data more accurately.

SUMMARY OF THE INVENTION

The present disclosure has been developed in order to solve the above described and other problems in the related art. Accordingly, an aspect of the present disclosure is to provide a context-awareness engine, which can analyze sensed data more specifically and perceive context more accurately.

The above aspect is achieved by providing a context-awareness engine including a spatial filtering unit which applies spatial filtering to sensed data which is output from sensors included in a group to filter data in which an error is not generated, a conditional decision unit which compares the filtered data with at least one condition to determine a current state of a place corresponding to the group, and a result processing unit which combines the determined current state and information regarding the group to generate a context-awareness result.

The spatial filtering unit may include an identification unit which compares a sensor which outputs the sensed data and a sensor included in the group to identify an operated sensor and a non-operated sensor, and an error data removal unit which removes error data from the data which is sensed by the operated sensor, and outputs the data in which the error is not generated to the conditional decision unit.

The spatial filtering unit may further include an administrator confirmation module which notifies a manger of an alarming message based on identification information regarding the non-operated sensor and the sensor which outputs the error data.

The at least one condition may include a duration, a range of sensed data, and a state which corresponds to the duration and the sensed data, and if a plurality of conditions is provided, the conditional decision unit may determine a state corresponding to a condition of the plurality of conditions that conforms to the filtered data as the current state.

The context-awareness engine may further include a temporal decision unit which re-determines the current state using the filtered data and stored past data to output a final decision result.

The temporal decision unit may compare the past data, a regulation which is extracted based on the past data, and the filtered data which is input from the conditional decision unit to re-determine the current state.

The extracted regulation may comprise a range of past data corresponding to a normal state, a range of past data corresponding to an abnormal state, a normal variation in the past data, and an upper limit value and a lower limit value of the past data.

If the conditional decision unit determines the current state to be normal, the temporal decision unit may compare the filtered data and the stored past data to re-determine the current state.

The result of re-determination may be one of normal, caution, attention, warning, danger and user-defined state, and the result processing unit may selectively provide an administrator with an alarming message according to the result of re-determination.

The result processing unit may combine one of the determined current state and the re-determined current state with identification information of the group, a time during which the data is sensed, and identification information of the sensor which senses the data to generate a context-awareness result.

The group may be a set of sensors which are installed in the same place and have the same operational condition.

BRIEF DESCRIPTION OF THE SEVERAL VIEWS OF THE DRAWINGS

These and/or other aspects and advantages of the disclosure will become apparent and more readily appreciated from the following description of the embodiments, and accompanying drawings in which.

Throughout the drawings, like reference numerals will be understood to refer to like parts, components and structures.

DETAILED DESCRIPTION OF THE INVENTION

Hereinafter, a context-awareness engine according to an exemplary embodiment of the present disclosure will now be described in greater detail with reference to the accompanying drawing figures.

Figure 1:
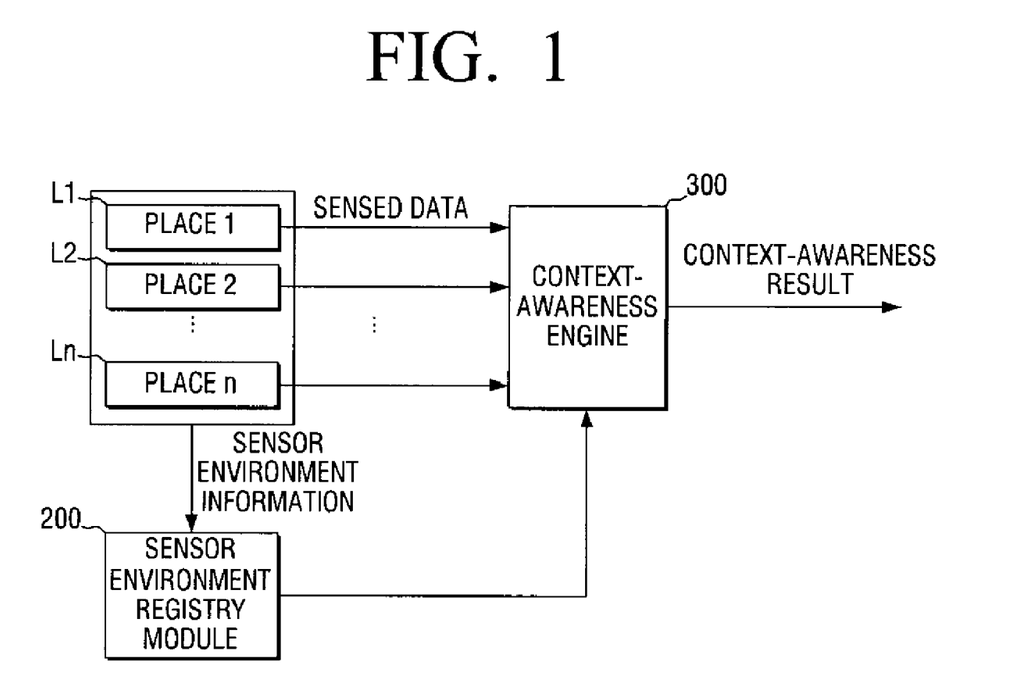
FIG. 1 is a block diagram illustrating a context-awareness system to which a context-awareness engine is applied according to an exemplary embodiment of the present disclosure.
Figure 2:
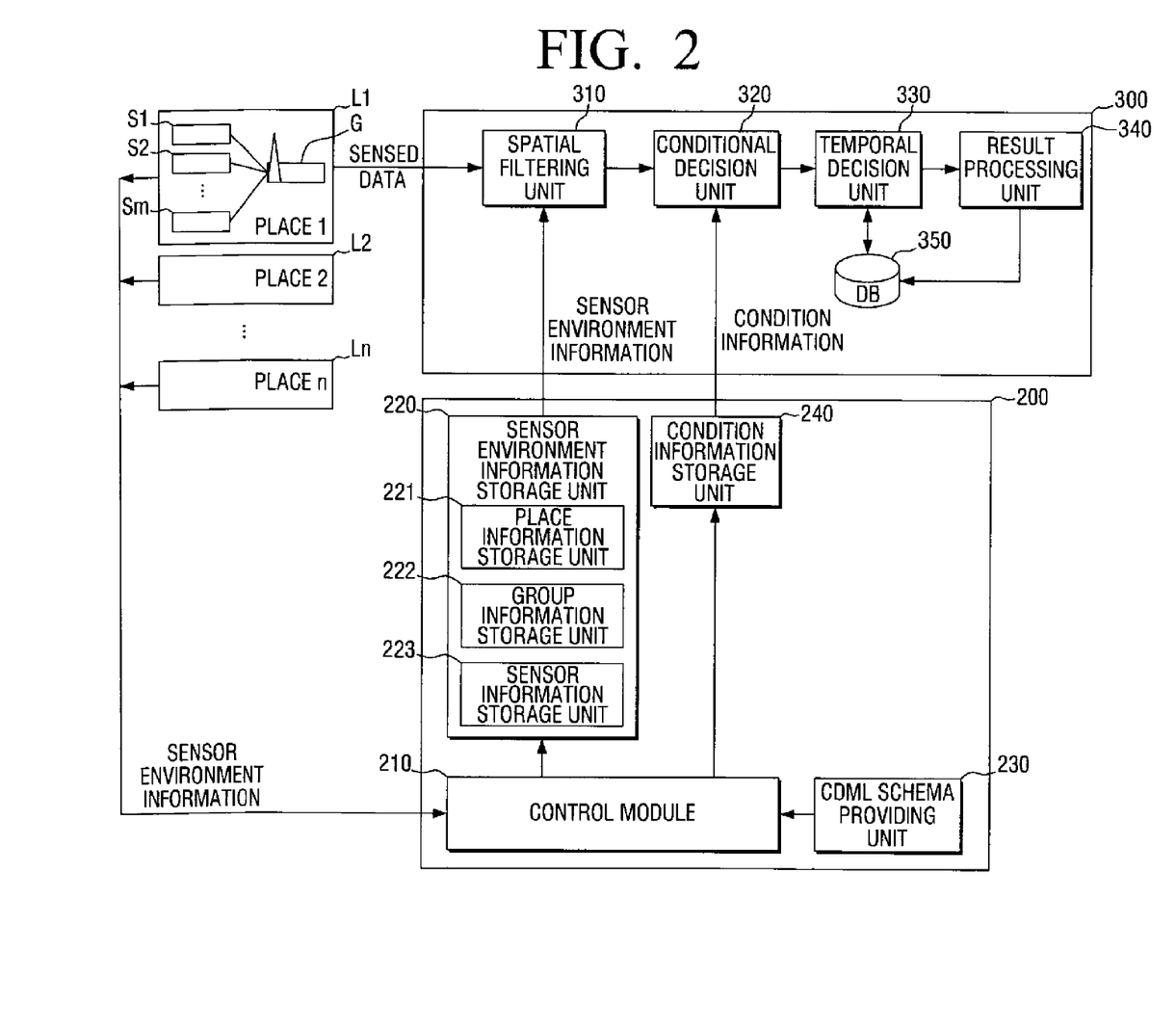
FIG. 2 is a block diagram illustrating the sensor environment registry module and the context-awareness engine of FIG. 1 in detail.

FIG. 1 is a block diagram illustrating a context-awareness system to which a context-awareness engine is applied according to an exemplary embodiment of the present disclosure, and FIG. 2 illustrates the sensor environment registry module and the context-awareness engine of FIG. 1 in detail.

The context-awareness system refers to a system which uses a sensor middleware to intelligently analyze sensed data in the WSN or USN environment. According to an exemplary embodiment of the present disclosure, the context-awareness system designates a plurality of groups including at least one sensor and perceives context in the unit of group. In particular, the context-awareness system determines the current state of a place corresponding to the group by applying spatial filtering and conditional decision to the data sensed by the sensor of the group, or determines the current state more accurately by selectively applying temporal decision using past data. The group refers to a set of sensors which are of the same type and have the same operational condition, among the sensors installed in the same place, that is, the sensors communicating with the same gateway.

The context-awareness system according to an exemplary embodiment of the present disclosure includes places L1, L2, . . . , Ln (n is a positive integer) where sensors are installed, a sensor environment registry module 200, and a context-awareness engine 300.

A plurality of sensors S1, S2, . . . , Sm (m is a positive integer) and a gateway G may be installed in each place L1, L2, . . . , Ln, and an administrator or a user selects at least one sensor from the sensors installed in each place L1, L2, . . . , Ln and designates the selected sensor as a group. The name of the designated group may be set by the administrator or the user or may be automatically assigned by the sensor environment registry module 200.

The gateway G transmits information about the sensor belonging to the designated group, that is, sensor environment information, to the sensor environment registry module 200, and transmits data sensed by the sensor to the context-awareness engine 300. The sensor environment information may include information about the designated group. The gateway G transmits the information about the sensor and the sensed data using a wired network or a wireless network.

The sensor environment registry module 200 registers the sensor environment information and the group information which are transmitted from the gateway G of each place L1, L2, . . . , Ln and condition information which will be used for conditional decision. The sensor environment information includes information about the places L1, L2, . . . , Ln where the sensors are installed and information about the sensors S1, S2, . . . , Sm which are installed in each place L1, L2, . . . , Ln.

Referring to FIG. 2, the sensor environment registry module 200 includes a control module 210, a sensor environment information storage unit 220, a CDML schema providing unit 230, and a condition information storage unit 240. The control module 210 analyzes the sensor environment information transmitted from the places L1, L2, . . . , Ln and classifies the sensor environment information into place information, group information, and sensor information, and store the classified information to the sensor environment information storage unit 220.

The control module 210 registers the place information, the group information, and the sensor information to a place information storage unit 221, a group information storage unit 222, and a sensor information storage unit 223 of the sensor environment information storage unit 220, respectively, and registers the condition information to be used in a conditional decision unit 320 to the condition information storage unit 240.

However, if the sensor environment information transmitted from the places L1, L2, . . . , Ln includes information about the designated group, the administrator is not required to designate the group in the sensor environment registry module 200 separately, but, if the sensor environment information does not include the information about the group, the administrator divides the group in the sensor environment registry module 200 and should directly register sensors belonging to the divided group.

As described above, the group refers to a set of sensors which are installed in the same place, have the same operational condition, and are of the same type. Therefore, each group includes the sensors of the same type. For example, if there are $1^{st}$ through $3^{rd}$ groups, the $1^{st}$ group may include sensors relating to temperature, the $2^{nd}$ group may include sensors relating to humidity, and the $3^{rd}$ group may include sensors relating to a fire. The group may be automatically classified by type of sensor by the control module 210 or may be manually classified by the administrator.

The place information storage unit 221 registers and stores place information, such as addresses, names (e.g., A block green house), and IDs of the places L1, L2, . . . Ln, administrator's name, administrator's phone number, and sensing period of the sensors S1, S2, . . . , Sm, under the control of the control module 210.

The group information storage unit 222 registers and stores information about the sensors of the same type to control the sensors. For example, the information stored in the group information storage unit 222 includes group information such as the ID of the group classified by the administrator or the user, the type of the sensor belonging to the group, the number of sensors, the ID list of the sensor, the conceptual meaning of the group place (e.g., a green house exit).

The sensor information storage unit 223 registers and stores information about the sensor installed in each place L1, L2, . . . , Ln, such as the type of sensor, the ID of sensor, sensor manufacturer, sensor installation place (e.g., first area of A block green house), and sensing period. The type of sensor may include a temperature sensor, a humidity sensor, a $CO_2$ sensor, a short circuit sensor, a fire sensor, a spark sensor, a door sensor, or an illuminance sensor.

Figure 6A:
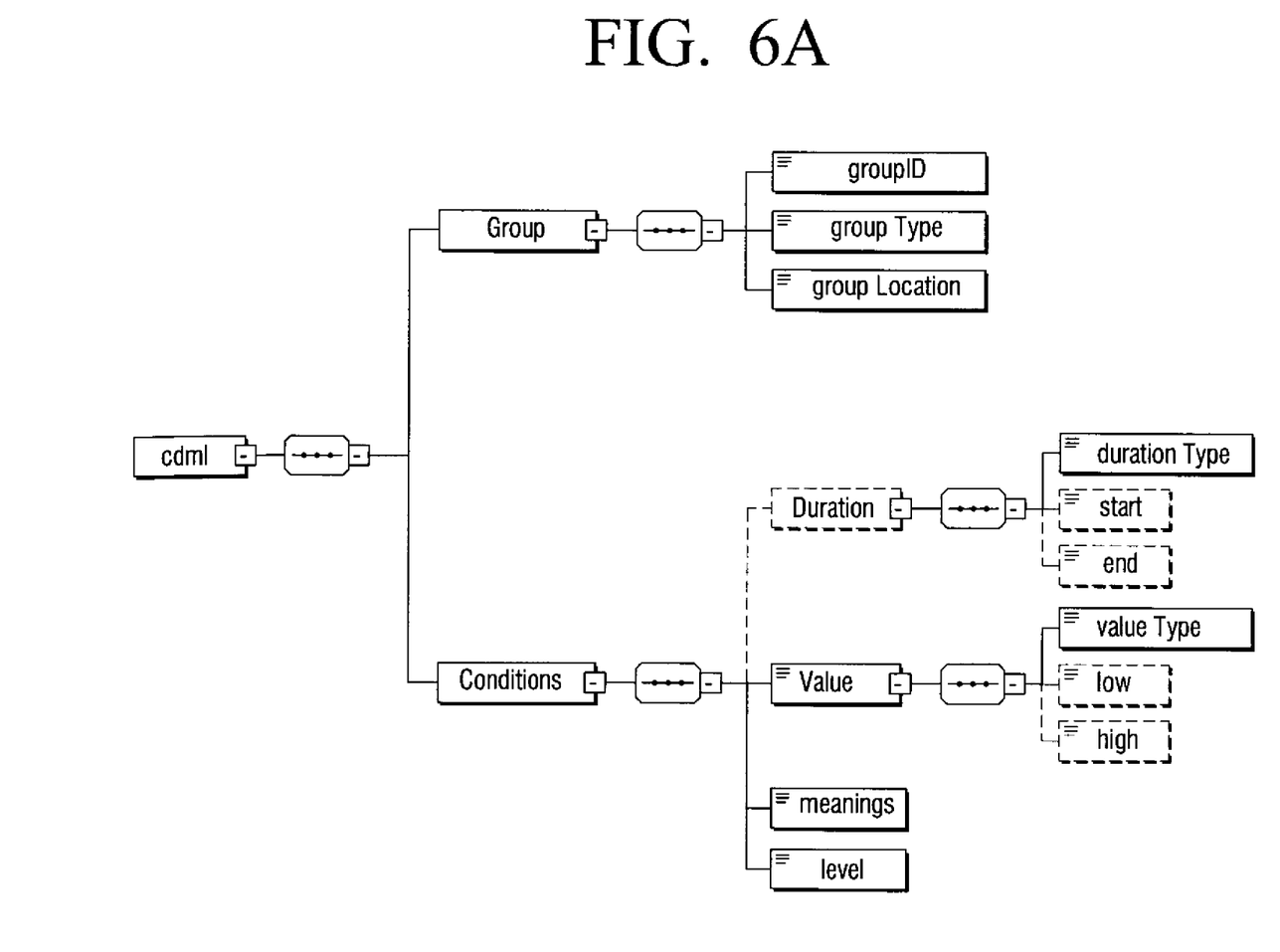
FIG. 6A is a view illustrating an example of CDML schema.

The control module 210 generates condition information based on the conditional data markup language (CDML) schema of the CDML schema providing unit 230 and registers and store the generated condition information to the condition information storage unit 240. The CDML schema has a structure shown in FIG. 6A and the condition information expressed by the CDML includes duration, sensed data (sensed value), and decision (meaning or level) and is generated for each group (Group, Group ID). For example, the condition information is generated as in following table 1.

TABLE 1

|  | Duration | Sensed Data | Decision |
| --- | --- | --- | --- |
| Condition Information 1: Group 1 | Always | 20° C.-30° C. | Normal |
| Condition Information 2: Group 2 | From Jan. 1, 2008 to Dec. 31, 2008 | Below 10° C. | Warning |
| Condition Information 3: Group 3 | From 7o'clok to 13 o'clock | 20° C.~30° C. | Normal |

Referring to table 1, according to condition information 1, it is determined that a current state is always normal if the data sensed by the sensors belonging to one group falls within 20°

C. to 30° C. The condition information stored in the condition information storage unit 240 is input to the conditional decision unit 320.

The context-awareness engine 300 conducts context-awareness in the unit of group based on the data sensed by one or more sensors installed in each place L1, L2, . . . , Ln. That is, as described above, the administrator or the user selects one or more sensors installed in each place L1, L2, . . . , Ln and indicates the sensors as a group, and the context awareness engine 300 perceives the context of the group or the place (e.g. L1) of the group based on the sensed data of the sensors belonging to the same group.

The context-awareness engine 300 includes a spatial filtering unit 310, the conditional decision unit 320, a temporal decision unit 330, a result processing unit 340, and a data base (DB) 350.

The spatial filtering unit 310 applies spatial filtering to the data sensed by the sensors of the same group, thereby filtering the data in which an error does not occur. The spatial filtering unit 310 performs spatial filtering using the sensor environment information stored in the sensor environment information storage unit 220, that is, the place information, the group information, and the sensor information.

Figure 3A:
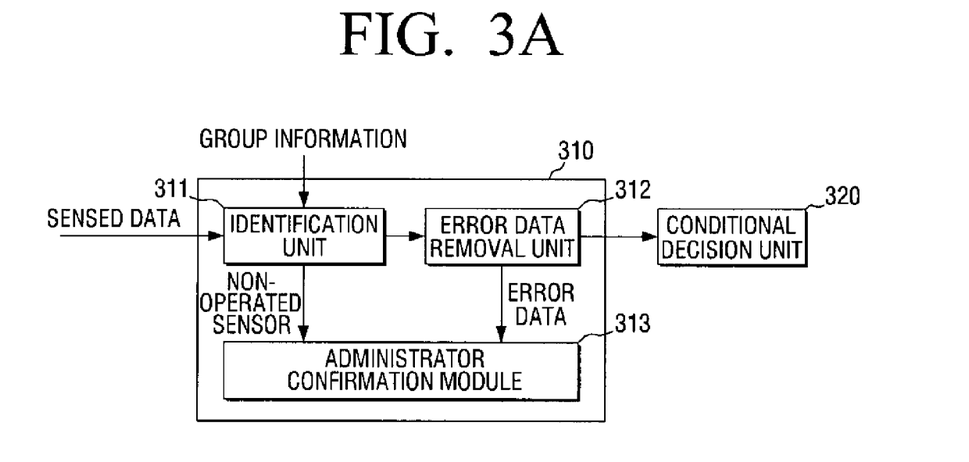
FIGS. 3A and 3B are block diagrams illustrating the spatial filtering unit of FIG. 2.

FIG. 3A is a view illustrating an example of the spatial filtering unit of FIG. 2.

Referring to FIG. 3A, the spatial filtering unit 310 includes an identification unit 311, an error data removal unit 312, and an administrator confirmation module 313.

The identification unit 311 analyzes the sensed data and identifies a sensor which has never transmitted sensed value. For this, the identification unit 311 receives sensed data transmitted from the sensors S1, S2, . . . , Sm of each place L1, L2, . . . , Ln through the gateway G, and receives the sensor environment information including the group information from the sensor environment information storage unit 220.

The sensed data include values sensed by the sensors S1, S2, . . . , Sm, place information of the sensors S1, S2, . . . Sm, time information regarding when the values are sensed, and group information of the group including the sensors S1, S2, . . . Sm. The identification unit 311 identifies the group to which the sensors S1, S2, . . . , Sm belong based on the group information of the sensor environment information, and identifies information regarding the sensors included in the identified group.

The identification unit 311 compares the information about the sensor which outputs the sensed data (e.g., sensor ID) with the sensor information of the identified group, thereby identifying an operated sensor and a non-operated sensor. For example, if there are 4 sensors (A~D) which output sensed data but if 5 sensors (A~E) are already registered in the group corresponding to the sensors (A~D), the identification unit 311 identifies the sensor E as a non-operated sensor or a malfunctioning sensor. The identification unit 311 transmits the sensed data of the operated sensor to the error data removal unit 312 and transmits information of the non-operated sensor to the administrator confirmation module 313.

The error data removal unit 312 removes error data from the sensed data of the operated sensor which are input from the identification unit 311, and outputs the data in which error does not occur to the conditional decision unit 320. For example, if the 4 sensors (A~D) sense temperature values of 19° C., 20° C., 21° C., and 40° C., respectively, the error data removal unit 312 determines that the sensor D malfunctions and transmits the sensed data output from the sensors (A~C) to the conditional decision unit 320.

The error data removal unit 312 removes error data using the following algorithm:

The error data removal unit 312 processes a sensed value having the largest difference between the sensed values in advance. For example, the error data removal unit 312 determines whether there is an error in the sensed value of 40° C. since the sensed value of 40° C. has the largest difference with respect to other temperature values. Hereinafter, the sensed value having the largest difference is referred to as a target value.

The error data removal unit 312 calculates a difference between the target value and an average of the other sensed values. That is, the error data removal unit 312 calculates the average of the sensed values, 19° C., 20° C., and 21° C., that is, 20° C., and calculates a difference between the values 20° C. and 40° C.

The error data removal unit 312 determines that the target value has an error if the calculated difference is above 50% of the average. For example, the difference 20° C. is calculated between the target value 40° C. and the average of the other sensed values 20° C. Since the difference 20° C. is 100% of the average, the error data removal unit 312 determines that the sensor D which senses 40° C. has an error or that there is an error only in the place where the sensor E is installed, and informs the administrator confirmation module 313 that error data of 40° C. is sensed by the sensor D.

The administrator confirmation module 313 stores information of the non-operated sensor and information of the sensor which outputs error data (e.g., identification information), and notifies the administrator of an alarming message. The administrator confirms the non-operated sensor or the malfunctioning sensor through the alarming message and determines whether the sensor actually malfunctions. The administrator confirmation module 313 transmits the information of the sensor which is confirmed as having actually malfunctioned by the administrator, that is, the administrator confirmation information to the context-awareness information generation unit 341.

Figure 3B:
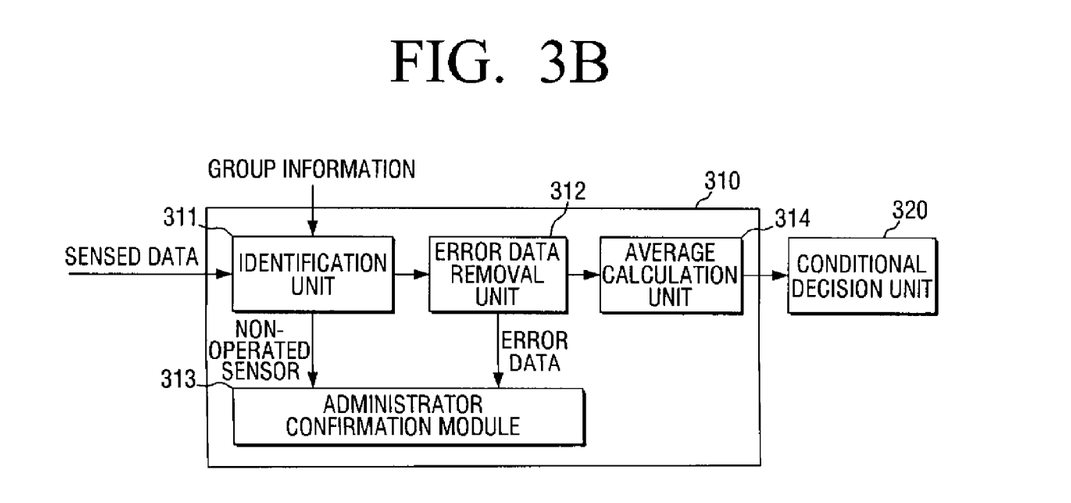

The spatial filtering unit 310 may further include an average calculation unit 314 as shown in FIG. 3B. The average calculation unit 314 calculates an average of sensed data in which error input from the error data removal unit 312 does not occur, and outputs the calculated average to the conditional decision unit 320. The average calculation unit 314 may calculate an average of sensed values included in the sensed data.

To this end, the spatial filtering unit 310 removes the sensor which has not transmitted sensed data and the sensor in which an error is generated, and outputs sensed data which is normally detected from the same group to the conditional decision unit 320.

Referring back to FIG. 2, the conditional decision unit 320 compares the sensed data which is filtered by the spatial filtering unit 310 with the condition information which is input from the condition information storage unit 240 to determine a current state of the place corresponding to the group. The conditional decision unit 320 outputs the determined current state, that is, the conditional decision information to the temporal decision unit 330.

For example, if a sensor corresponding to the filtered data belongs to group 1, the conditional decision unit 320 determines the current state using the condition information 1 of table 1. The decision result of the conditional decision unit 320 includes 'normal', 'warning', 'danger', and 'user-defined state'. The user-defined state is a current state set by the user or the administrator.

Figure 4:
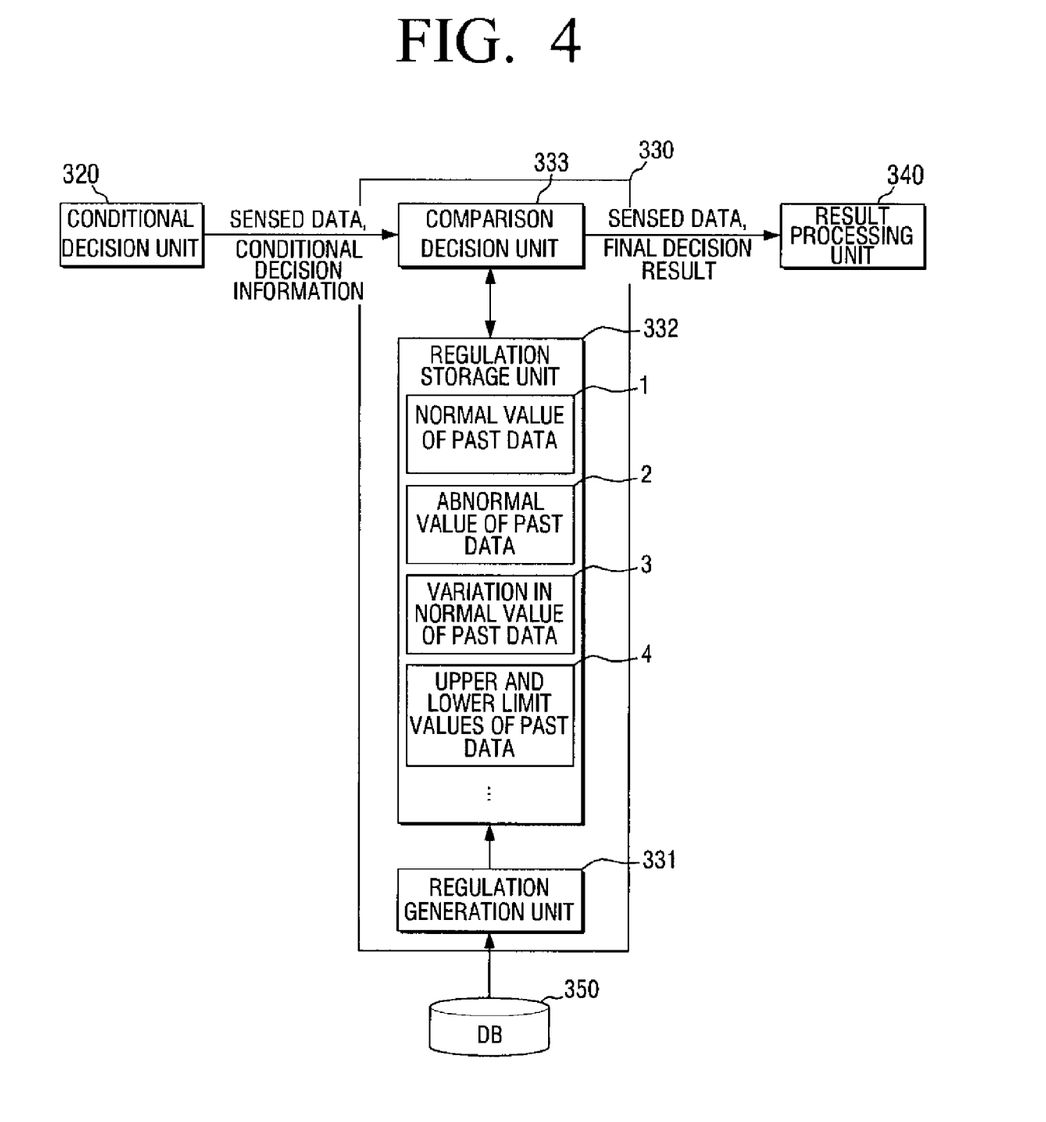
FIG. 4 is a block diagram illustrating the temporal decision unit of FIG. 2 in detail.

FIG. 4 is a diagram illustrating the temporal decision unit of FIG. 2 in detail.

The temporal decision unit 330 re-determines the current state which has been determined by the conditional decision unit 320 using past data accumulated in the DB 350, regulation generated from the past data, and filtered data. That is, the temporal decision unit 330 complements the determined current state using the past data. The past data is data which was sensed for a specific time in the past and includes sensed values, identification information of the sensor and group information of the sensor, and result of decision by sensed value (e.g., warning). In particular, the temporal decision unit 330 compares the current state, 'normal', determined by the conditional decision unit 320 with the regulation of the past data to re-determine the current state more specifically.

Referring to FIG. 4, the temporal decision unit 330 includes a regulation generation unit 331, a regulation storage unit 332, and a comparison decision unit 333.

The regulation generation unit 331 generates regulation (a result caused by condition) based on the past data stored in the DB 350. The regulation generation unit 331 generates regulation (1) for the normal value of the past data, regulation (2) for the abnormal value of the past data, regulation (3) for a variation in the normal value of the past data, and regulation (4) for an upper limit and a lower limit of the past data, and stores the regulations to the regulation storage unit 332.

For example, the regulation (1) of the normal value of the past data prescribes that, if a currently sensed temperature is from 20° C. to 30° C., a current state is determined to be normal since the temperature of 20° C. to 30° C. was determined to be normal for the past 3 years. The regulation (3) for the variation in the normal value of the past data prescribes that if temperature abruptly rises by above 50%, the current state is determined to be a warning since the abrupt rise in temperature by above 50% indicates presence of fire.

The comparison decision unit 333 compares the filtered data input from the conditional decision unit 320 and the determined current state with the regulation stored in the regulation storage unit 332 to re-determine the current state, and generate a final decision result. The comparison decision unit 333 has the option of re-determining the current state, depending on the current state determined by the conditional decision unit 320.

For example, if the current state is determined to be normal by the conditional decision unit 320, the comparison decision unit 333 additionally re-determines the current state to generate a final decision result such as 'normal', 'caution', 'attention', or a 'user-defined state'. The 'caution' and 'attention' is to classify a normal state more specifically, and indicate when a current state is determined to be abnormal compared to the past data, even if the current state seems normal.

If the current state is determined to be 'warning' or 'danger' by the conditional decision unit 320, the comparison decision unit 333 perceives that the current state is an emergency state and transmits the state to the result processing unit 340 without conducting a further comparing process.

Accordingly, the result processing unit 340 receives the current state which is determined to be 'danger' or 'warning' by the conditional decision unit 320 and which bypasses the temporal determination unit 330, and also receives the current state re-determined to be 'normal', 'caution', 'attention', or 'user-defined state' by the temporal determination unit 330.

Hereinafter, the 'normal', 'caution', 'attention', 'warning', and 'danger' and user-defined states will be described.

The comparison decision unit 333 determines that the current state is 'normal' if 'the normal' state determined by the conditional decision unit 320 is mapped with the regulation (1) of the regulation storage unit 332.

The comparison decision unit 333 determines the current state to be 'caution', which is more dangerous than the normal state, if the 'normal' state determined by the conditional decision unit 320 has a variation compared the average data of the past data. The variation refers to a reference value which is pre-calculated to determine the current state.

The comparison decision unit 333 determines the current state to be 'attention', which is more dangerous than the normal state, if the 'normal' state determined by the conditional decision unit 320 has an abrupt variation compared to the average data of the past data. The abrupt variation refers to a reference value which is pre-calculated to determine the current state.

If the current 'normal' state determined by the conditional decision unit 320 is determined to be neither 'normal', 'caution', nor 'attention' by the comparison decision unit 333, the comparison decision unit 333 determines that the current state is a 'user-defined state' which is defined by the user. For example, the user checks the current state which is determined to be 'user-defined state' and perceives that the current state is neither 'normal', 'warning', nor 'danger' and that it is difficult to determined the current state.

Figure 5:
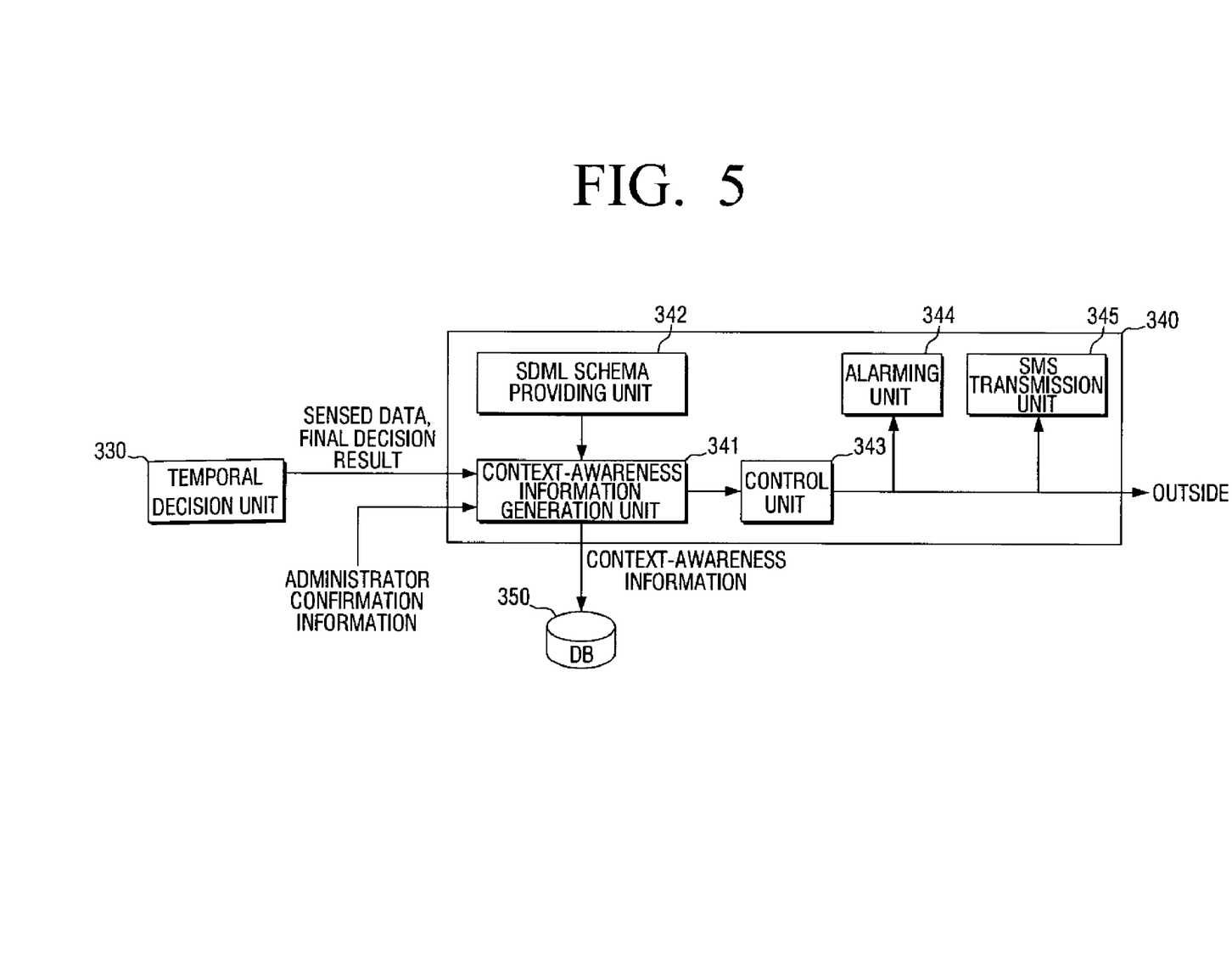
FIG. 5 is a block diagram illustrating the result processing unit of FIG. 2 in detail.

FIG. 5 is a view illustrating the result processing unit of FIG. 2.

The result processing unit 340 of FIG. 5 combines the current state input from the temporal decision unit 330 and information regarding the group to generate a context-awareness result. The information regarding the group is known from the information included in the sensed data input to the spatial filtering unit 310. That is, the information regarding the group may be places, time information of the sensor which sense data (e.g., S1, S2, ..., Sm) or identification information of the group to which the sensors S1, S2, ..., Sm belong.

The result processing unit 340 includes a context-awareness information generation unit 341, a sensing data markup language (SDML) schema providing unit 342, a control unit 343, an alarming unit 344, and a short message service (SMS) transmission unit 345.

Figure 6B:
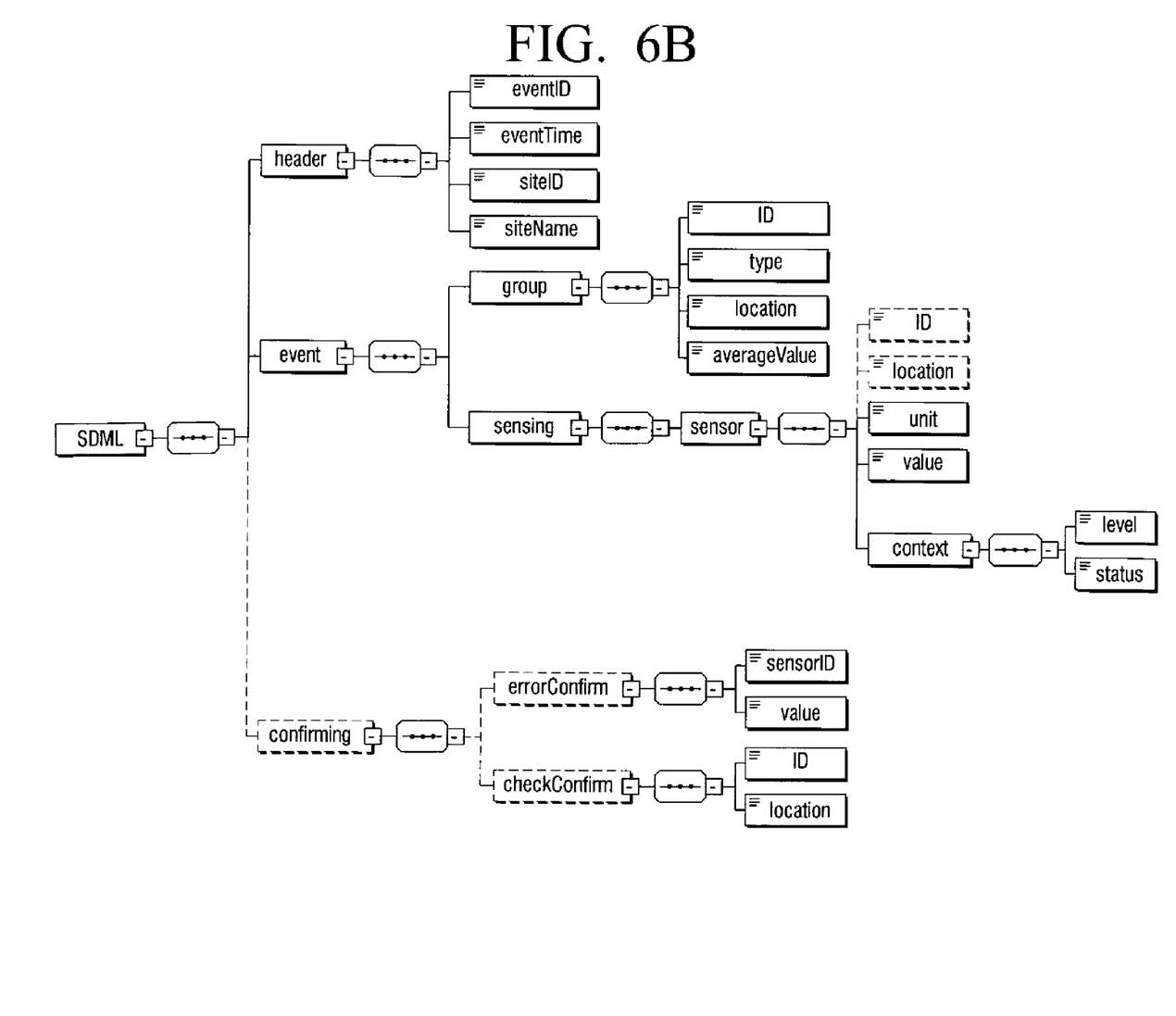
FIG. 6B is a view illustrating an example of SDML schema.

The context-awareness information generation unit 341 generates context-awareness information based on the SDML schema of the SDML schema providing unit 342, and transmits the generated context-awareness information to the control unit 343. The SDML schema has a structure shown in FIG. 6B. In FIG. 6, the block 'group' indicates information regarding each group to which the sensor belongs, the block 'sensing' indicates information regarding each sensor, and the block 'error Confirm' indicates information regarding the sensor in which an error is generated.

The context-awareness information generation unit 341 receives the sensed data and the final decision result from the temporal decision unit 330 and receives the administrator confirmation information from the administrator confirmation module 313, and combines the sensed data, the final decision result, and the administrator confirmation information to generate context-awareness information. That is, the context-awareness information includes the final decision result input from the temporal decision unit 330.

The context-awareness information generated based on the SDML is stored to the DB 350.

The control unit 343 is adaptively operated according to the final decision result included in the context-awareness information. If the current state is determined to be 'normal', the control unit 343 does not perform extra operation, and if the current state is determined to be 'caution', 'attention', or a user-defined state, the control unit 343 requests the administrator, who should be reported preferentially, to check the current state since an error is detected from the sensors S1, S2, ..., Sm through the SMS transmission unit 345.

If the current state is determined to be 'danger', the control unit 343 controls the alarming unit 344 to notify the emergency state of the place where the sensors S1, S2, ..., Sm are installed to allow the administrator to take appropriate measures.

For example, if the sensors S1, S2, . . . , Sm are fire sensors and the current state is determined to be 'warning' as a final decision result, the control unit 343 determines that there is a possibility of presence of fire and controls the SMS transmission unit 345 to transmit an alarming message to the administrator.

Also, if the sensors S1, S2, . . . , Sm are fire sensors and the current state is determined to be 'danger' as a final decision result, the control unit 343 determines that fire occurs and informs a fire station and an administrator, who should be reported of the current state secondarily, of the emergency state. For example, the control unit 343 controls a sprinkler and a blower installed in the place to be operated, or controls the SMS transmission unit 345 to transmit a SMS to inform the fire station and the administrator of the emergency state or to ring an emergency bell to notify the emergency state.

According to the context-awareness engine 300 according to the exemplary embodiment of the present disclosure, the data which is sensed by the sensors belonging to the same group is analyzed more specifically so that the context can be perceived more accurately. In particular, the present disclosure applies the spatial filtering, the conditional decision, and the temporal decision using the past data, thereby enabling accurate context-awareness.

Also, the context-awareness engine 300 according to the exemplary embodiment of the present invention intelligently analyzes the sensed data and provides a solution according to the result of analysis. Accordingly, in the ubiquitous society, monitoring systems such as environment monitoring system, agricultural product growth monitoring system, and army monitoring system can by intelligently controlled by the context-awareness system of the present disclosure without human intervention.

Although a representative exemplary embodiment of the present disclosure has been illustrated and described in order to exemplify the principle of the present disclosure, the present disclosure is not limited to the specific exemplary embodiment. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A context-awareness engine comprising:
a spatial filtering unit which applies spatial filter to sensed data which is output from sensors included in a group to filter data in which an error is not generated;
a conditional decision it which compares the filtered data with at least one condition to determine a current state of a place corresponding to the group; and
a result processing unit which combines the determined current state and information regarding the group to generate a context-awareness result;
wherein the spatial filtering unit comprises:
an identification unit which compares a sensor which outputs the sensed data and a sensor included in the group to identify an operated sensor and a non-operated sensor; and
an error data removal unit which removes error data from the data which is sensed by the operated sensor, and outputs the data in which the error is not generated to the conditional decision unit.

2. The context-awareness engine of claim 1, wherein the spatial filtering unit further comprises an administrator confirmation module which notifies a manager of an alarming message based on identification information regarding the non-operated sensor and the sensor which outputs the error data.

3. The context-awareness engine of claim 1, further comprising a temporal decision unit which re-determines the current state using the filtered data and stored data sensed in the past to output a final decision result.

4. The context-awareness engine of claim 3, wherein the temporal decision unit compares the past data, a regulation which is extracted based on the past data, and the filtered data which is input from the conditional decision unit to re-determine the current state.

5. The context-awareness engine of claim 4, wherein the extracted regulation comprises a range of past data corresponding to a normal state, a range of past data corresponding to an abnormal state, a normal variation in the past data, and an upper limit value and a lower limit value of the past data.

6. The context-awareness engine of claim 3, wherein, if the conditional decision unit determines the current state to be normal, the temporal decision unit compares the filtered data and the stored past data to re-determine the current state.

7. The context-awareness engine of claim 6, wherein the result of re-determination is one of normal, caution, attention, warning, danger and user-defined state, and the result processing unit selectively provides an administrator with an alarming message according to the result of re-determination.

8. The context-awareness engine of claim 3, wherein the result processing unit combines one of the determined current state and the re-determined current state with identification information of the group, a time during which the data is sensed, and identification information of the sensor which senses the data to generate a context-awareness result.

9. The context-awareness engine of claim 1, wherein the group is a set of sensors which are installed in the same place and have the same operational condition.

10. A context-awareness engine comprising:
a spatial filtering unit which applies spatial filtering to sensed data which is output from sensors included in a group to filter data in which an error is not generated;
a conditional decision unit which compares the filtered data with at least one condition to determine a current state of a place corresponding to the group; and
a result processing unit which combines the determined current state and information regarding the group to generate a context-awareness result;
wherein the condition includes at least one of a duration, a range of sensed data, and a state which corresponds to the duration and the sensed data,
wherein, if a plurality of conditions is provided, the conditional decision unit determines a state corresponding to a condition of the plurality of conditions that conforms to the filtered data as the current state.

* * * * *